US011864691B2

(12) United States Patent
Hack et al.

(10) Patent No.: US 11,864,691 B2
(45) Date of Patent: Jan. 9, 2024

(54) INTELLIGENT BLENDER

(71) Applicant: Sunbeam Products, Inc., Boca Raton, FL (US)

(72) Inventors: Gregory Hack, Hallandale, FL (US); Joseph C. Spencer, Hattiesburg, MS (US); Henry H. Adair, Jr., Canton, GA (US)

(73) Assignee: Sunbeam Products, Inc., Atlanta, GA (US)

( * ) Notice: Subject to any disclaimer, the term of this patent is extended or adjusted under 35 U.S.C. 154(b) by 482 days.

(21) Appl. No.: 16/651,090

(22) PCT Filed: Oct. 2, 2018

(86) PCT No.: PCT/US2018/053849
§ 371 (c)(1),
(2) Date: Mar. 26, 2020

(87) PCT Pub. No.: WO2019/070629
PCT Pub. Date: Apr. 11, 2019

(65) Prior Publication Data
US 2020/0229647 A1    Jul. 23, 2020

Related U.S. Application Data

(60) Provisional application No. 62/566,743, filed on Oct. 2, 2017.

(51) Int. Cl.
*A47J 43/046* (2006.01)
*A47J 43/042* (2006.01)
(Continued)

(52) U.S. Cl.
CPC .......... *A47J 43/046* (2013.01); *A47J 43/042* (2013.01); *A47J 43/085* (2013.01); *A47J 43/0727* (2013.01)

(58) Field of Classification Search
CPC ...... A47J 43/046; A47J 43/042; A47J 43/085; A47J 43/0727; B01F 35/212;
(Continued)

(56) References Cited

U.S. PATENT DOCUMENTS

2008/0223963 A1    9/2008  Mally
2009/0110788 A1*   4/2009  Ciancimino .......... B01F 27/805
                                                        366/142
(Continued)

FOREIGN PATENT DOCUMENTS

CN    201445418 U    5/2010
CN    201622329 U    11/2010
(Continued)

*Primary Examiner* — Marc C Howell
(74) *Attorney, Agent, or Firm* — Husch Blackwell LLP

(57) ABSTRACT

A blender or food processor having electronics associated therewith including at least one controller, at least one current sensor and at least one speed sensor, the controller controls the operation of the blender motor based upon the contents being blended inside the blender jar and compares measured current and speed values and measured changes in the current and speed values to predetermined values stored in memory in order to (1) determine the load size placed in the blender jar, (2) determine if cavitation exists in the blender jar, and (3) determine the final consistency associated with the output of the product placed within the blender jar as selected by the user.

19 Claims, 14 Drawing Sheets

(51) Int. Cl.
*A47J 43/08* (2006.01)
*A47J 43/07* (2006.01)

(58) Field of Classification Search
CPC .. B01F 35/222; B01F 35/214; B01F 35/2142;
B01F 35/2144; B01F 35/2221
USPC ........................................................ 366/205
See application file for complete search history.

(56) References Cited

U.S. PATENT DOCUMENTS

| | | |
|---|---|---|
| 2013/0168475 A1 | 7/2013 | Bohannon, Jr. et al. |
| 2013/0214716 A1 | 8/2013 | Barfus et al. |
| 2013/0340456 A1* | 12/2013 | Hoare ................. B01F 35/2215 62/126 |
| 2014/0231562 A1* | 8/2014 | Potter .................... B02C 18/20 241/285.2 |
| 2016/0256006 A1* | 9/2016 | Dickson, Jr. ............ B01F 27/61 |
| 2016/0296899 A1 | 10/2016 | Hoare et al. |
| 2017/0232411 A1 | 8/2017 | Smith et al. |

FOREIGN PATENT DOCUMENTS

| | | |
|---|---|---|
| CN | 204670977 U | 9/2015 |
| JP | 2010521221 A | 6/2010 |
| WO | 2016197182 A1 | 12/2016 |

* cited by examiner

INTELLIGENT BLENDER

CROSS-REFERENCE TO RELATED APPLICATIONS

This application is a U.S. National Phase Application of International Application No. PCT/US2018/053849 filed on Oct. 2, 2018, which claims the benefit of priority from Provisional U.S. Patent Application No. 62/566,743 filed on Oct. 2, 2017. The disclosures of both applications are incorporated herein by reference.

BACKGROUND OF INVENTION

The present invention relates generally to blenders and food processors, and, more particularly, to a blender or food processor that can adapt to the contents being blended inside the blender container by detecting the load within the blender jar and producing a blended product at a predetermined desired consistency as selected by the user.

The present intelligent blender was created in order to eliminate fixed timing programs associated with conventional blenders and food processors. The problem with traditional blending is that despite what a user puts into the blending jar, traditional blenders execute the same program regardless of the contents placed within the blending jar. These prior art programs run the same startup procedure, the same processing procedure, and run for the same end point time regardless of the load put on the blending system by the contents within the blending jar. This means that smaller loads are over processed, frozen drinks are thinned out beyond the amount desired, and cavitation on thicker, heavier loads becomes an inconsistent problem.

The goal of the present invention is to create an intelligent blender that adapts to what the user puts inside the blending jar and what is needed to produce the desired output. The present invention therefore addresses the above deficiencies associated with traditional blenders and food processors as well as other needs which will become apparent to those skilled in the art after reading the present disclosure.

SUMMARY OF INVENTION

The present invention is directed to several embodiments of an intelligent blender that can adapt to the contents being blended inside the blending jar by sensing speed and resistance (current) so as to detect the load inside the blending jar. The present blender also adapts to cavitation and produces a finished product at a predetermined desired consistency as selected by the user. Separate programs are outlined for different types of food products such as smoothies, shakes, salsa's and other food contents, and then provides an optimal output consistency of the product based upon the type of product selected or the user's selected desired output consistency. These end point consistencies can be selected by the user according to desired taste.

Additionally, the present blender can also sense a zero load, high speed situation that defines blending cavitation. Once in either high speed (undetected) cavitation or regular or standard cavitation, the present blender applies a blending algorithm segment to eliminate the cavitation and draw the contents within the blender jar down to the rotating blades so as to continue on with the selected program. The present system will recover from low liquid and two different cavitation situations that were discovered during a regular high speed blending cycle.

Variable programs have been developed so that a consistent blend output is achieved inside the blender jar despite the different quantities of the ingredients added to the blender jar. The variable programs adapt to the changing conditions placed on the agitator system inside the blending jar. The present system is designed to adapt to variable ingredients that are introduced into the blending jar in any order or any amount. This is accomplished by creating a system that auto detects the resistance load and speed of the agitator blades to determine the right amount of blending needed to create the desired predetermined consistency. The present blender also uses a reversible motor design feature at selected times to break up the contents within the blender jar and escape from a cavitation situation.

These and other specific aspects and advantages of the present embodiments will be apparent to those skilled in the art after reviewing the following detailed description of illustrated embodiments set forth below which, taken in conjunction with the accompanying drawings, disclose an improved intelligent blender and/or food processor.

DETAILED DESCRIPTION OF THE INVENTION

Several embodiments of the present invention will now be explained with reference to the accompanying drawings. It will be apparent to those skilled in the art from this disclosure that the following description of the various embodiments of the present invention is provided for illustration purposes only and not for the purposes of limiting the present invention as defined by the appended claims and their equivalents.

Figure 1:
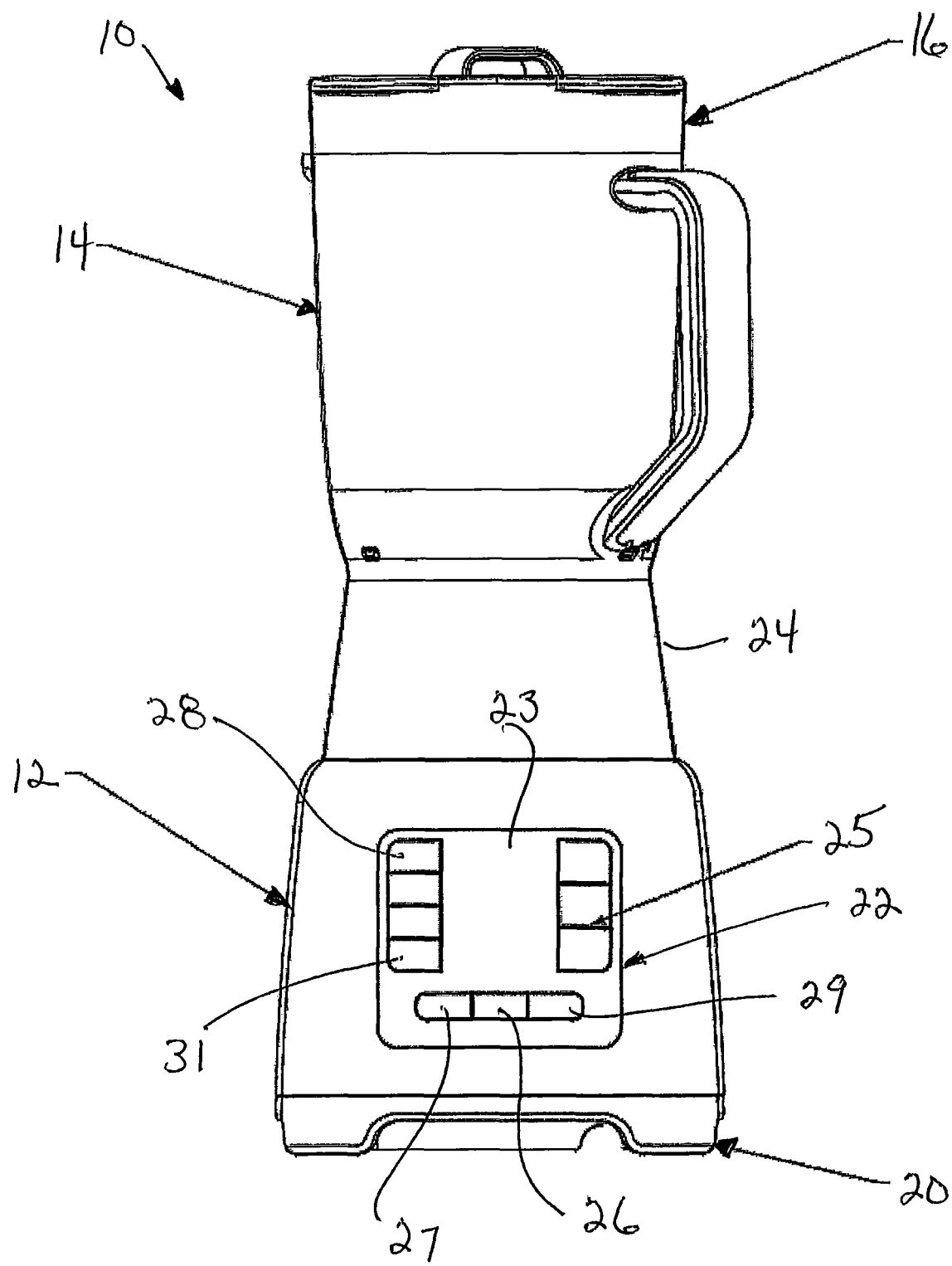
FIG. 1 is a front elevational view of one embodiment of a blender unit constructed in accordance with the teachings of the present invention.
Figure 2:
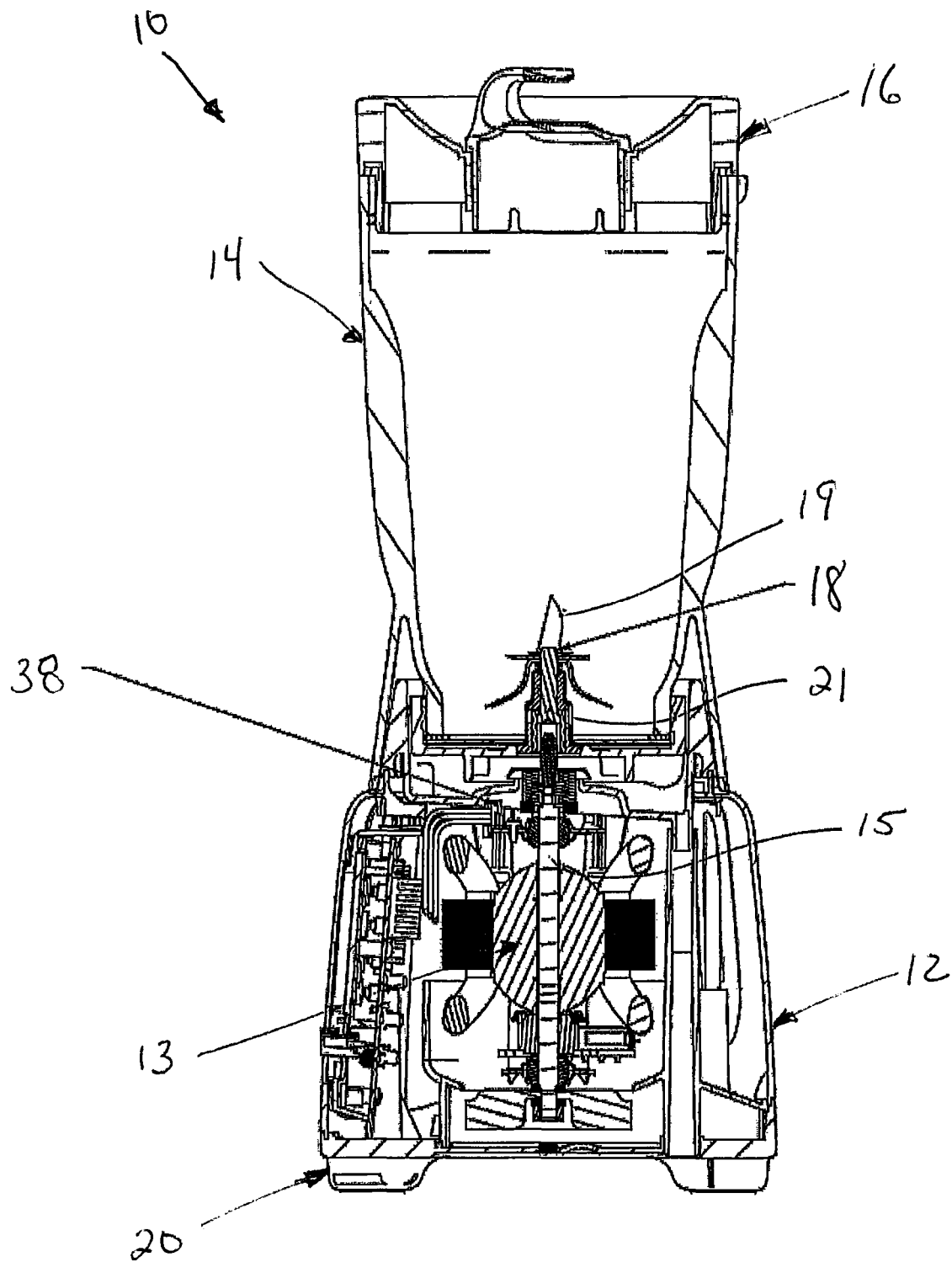
FIG. 2 is a cross-sectional view of the blender unit of FIG. 1.

Referring to the drawings more particularly by reference numbers wherein like numbers refer to like parts, number 10 in FIGS. 1 and 2 refers to one embodiment of an intelligent blender system 10 constructed in accordance with the teachings of one embodiment of the present invention. Electric blenders typically include a body or base assembly which includes a motor for coupling to an agitator system associated with a blender jar or mixing chamber that couples to the base assembly. More particularly, the overall blender system 10 includes a base assembly 12, a mixing container or jar assembly 14 and a lid member 16. The base assembly 12 houses the blender motor 13, electronics, couplings, and is the attachment point between the jar assembly 14, an agitator assembly 18 and the motor 13. In one embodiment, the base assembly 12 includes a base cover 20 which essentially is a stand that the blender unit sits on. The base cover 20 covers the bottom of the base assembly 12 and houses air vents for motor air circulation. The base assembly includes a cord winding area underneath that allows for easy cord storage and it also houses a mechanism that keeps the blender stable during high rotation and high motor torque situations. The jar assembly 14 is positioned on top of and engages the bases assembly 12 in a conventional manner and defines the blending chamber in which ingredients are added for blending. The present blender unit can operate with multiple different jar assemblies including, but not limited to, an 8 cup jar assembly, a 6 cup jar assembly, a 750 ml personal jar assembly and other food processor attachments. The lid member 16 closes off the top of the jar container 14 and is removable from the container in a conventional manner.

The base assembly 12 includes a user interface 22 for controlling the various modes of operation of the present blender. User interface 22 includes a PC Board Assembly (PCBA) that controls the workings of the blender. The workings are controlled by various electronic components including but not limited to at least one microcontroller, switches, relays, at least one current sensor 36, at least one speed sensor 38 and other electronics. The user interface 22 also serves as the user input and control communication interface with the blender as will be hereinafter further explained. In this regard, it is recognized and anticipated that the base assembly 12 can take on a wide variety of different shapes and configurations in that other control interfaces can likewise be utilized with the base assembly 12 to control the operation of the blender unit 10.

The agitator assembly 18 includes one or more bi-directional blades 19 for food chopping, supporting ball bearings, and a base agitator sleeve 24 associated with base assembly 12 that couples to the bottom of the blender jar 14. The primary purpose of the agitator assembly 18 is to chop up, grind and agitate the contents of the jar to transform the food contents into the desired output. The agitator blades 19 are located within the bottom of the blender jar 14 and are attached to an agitator shaft 21. The blades rotate at high speeds to chop and crush any contents inserted into the jar container 14. The agitator shaft 21 is rotated within a set of one or more agitator ball bearings which maintain the concentricity of the agitator shaft. The agitator shaft 21 connects the agitator blades 19 to the base motor shaft 15 through cooperatively engageable couplings well-known in the industry. The couplings allow for removal of the jar assembly 14 from the base assembly 12 as well as the agitator shaft from the blender motor housed within the base assembly 12.

The user interaction with the present blender assembly is greatly simplified. For example, the user is simply required to insert ingredients into the jar assembly 14, closed the jar with lid 16, and then select the desired program which range from, but are not limited to, programs for blending smoothies, shakes, salsas, fruits and vegetables, frozen drinks, juices, chopping and dicing. The desired program is selected from the user interface 22 which may include a graphic display screen 23, manual selection buttons 25, a pulse button 26, a power on/off switch 27, a food mode selection button 28, a start/stop button 29, a desired product output consistency button 31 and other features. Depending upon the selected program, the user is sometimes further required and prompted to select the desired consistency end point of the blended product. This is typically seen in the liquid blending program which covers smoothies, frozen drinks and fruits and vegetables where the user has the ability to achieve variable consistency such as a thick smoothie or a thin smoothie. Thick is defined as a more viscous and in general larger particle sizes as compared to a thin food product. The thin smoothie or other food product is processed longer. Once the desired program is selected, a user simply presses the start button 29 on the user interface 22 and the blending operation will begin as will be hereinafter further explained.

Figure 3:
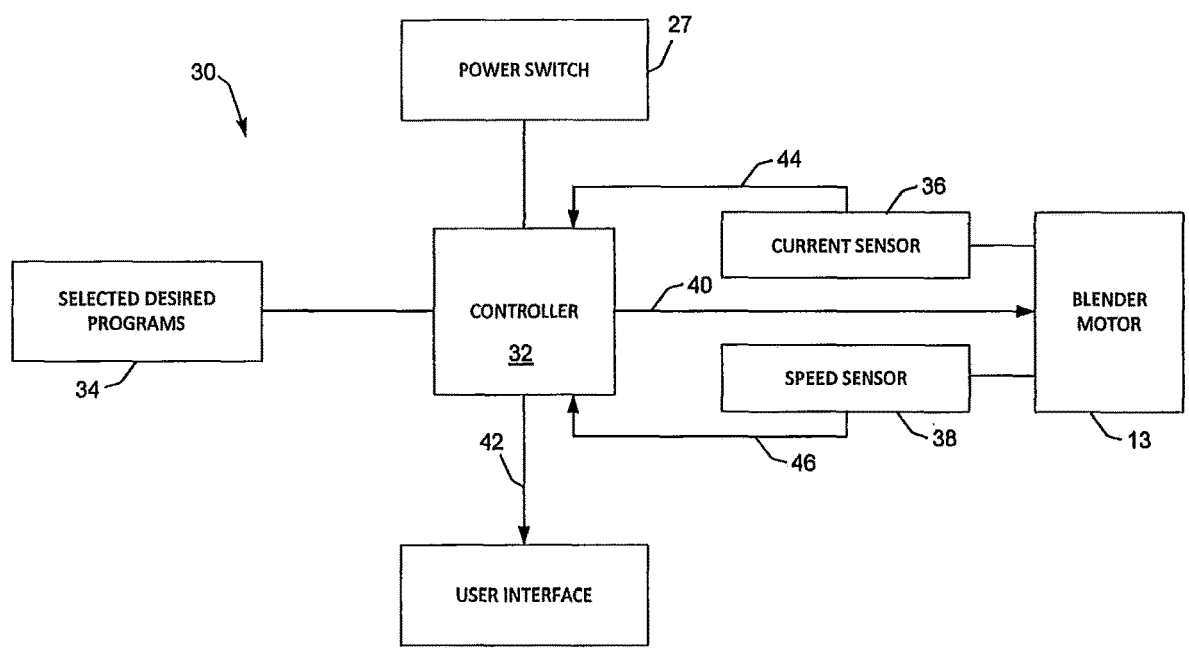
FIG. 3 is simplified block circuit diagram of some of the electrical components associated with the blender unit of FIGS. 1 and 2.

FIG. 3 is a simplified block circuit diagram 30 of one embodiment of at least some of the electrical components associated with the present blender unit 10. These components act to control the blender motor 13 in accordance with the various programs selected. Some of the components shown in FIG. 3 may be located on the PC Board Assembly (PCBA) or elsewhere in the base assembly 12. As illustrated in FIG. 3, the PC board assembly housed within the base assembly 12 includes at least one microprocessor 32 which includes in its associated memory various desired programs 34 associated with the present unit 10. The controller 32 may include one or more computer processors, computer memory and is configured to communicate by various communication links with at least one current sensor 36, at least one speed sensor 38, the power switch 27, and the user interface 22. Sensors 36 and 38 are implemented in the present blender to accurately detect loads, cavitation and end point consistency. The current sensor 36 senses the current being consumed by the blender motor. This is done by using various components to correctly sense the amount of current and thus the load on the blender at any particular moment. Speed of the rotating agitator blades is sensed by the speed sensor 38 which can be a Hall effect sensor which counts the rotational speed of a magnetic switch and calculates the revolutions per second. With the combination of both current and speed sensing, the present blender 10 has the ability to sense cavitation, load size inside the blender jar 14, and then determine end point consistency according to predetermined settings, various deltas or timing intervals associated with the speed and/or current, which inputs are continuously fed back to the microcontroller 32 as illustrated in FIG. 3 and as will be further explained.

The controller 32, in at least one embodiment, controls the operation of the blender motor 13 through respective relays, circuits and/or conductive path 40. The current sensor 36 and the speed sensor 38 monitor current flow and speed of the blender motor and provide feedback to the controller 32 along conductive paths 44 and 46 as will be hereinafter further explained. The current sensor 36 will measure the current draw associated with the blender motor 13 during various stages of operation depending upon the particular selected desired program 34 selected by the user and the speed sensor 38 will measure the speed associated with the blender motor 13 during its various stages of operation. Based upon lookup tables or programming stored within the memory of the controller 32, the controller will activate the blender motor 13 and/or other selected programs as will be hereinafter further explained in order to achieve the desired consistency of the output of the products selected by the user, or in order to overcome a cavitation situation that has developed during the blending process. The power switch 27 is coupled to the controller 32 and functions as an on/off switch for activating and deactivating the overall blender system and programs. The user interface 22 is likewise coupled to the controller 32 via conductive path 42 and, based upon the selected program, or based upon feedback from the current sensor 36 and/or speed sensor 38, the controller 32 may likewise interact with the user by presenting graphical displays of the status of the particular desired selected program, or requesting information from the user in order to alleviate a cavitation situation.

A recipe program, a liquid blending program, a prep ingredients program, a standard cavitation test program, a high speed cavitation test program, an analyze current status program, a smoothie program, a shake program, a salsa program, a juice program, a chopping program and a dicing program can be programmed into the memory associated with the controller 32. It is also recognized and anticipated that other programs and other routines can likewise be programmed into controller 32, or other memory means, for reasons including, but not limited to, the type of product or ingredients placed within the blender jar 14, the size and shape of the blender jar used in association with the present device 10, other consistency output levels other than those discussed above, and specific recipes used for blending specific products. The controller 32 is operable to execute any one or more of these programs, or other programs, for controlling both the speed and direction of the blender motor and associated agitator blades.

Figure 4:
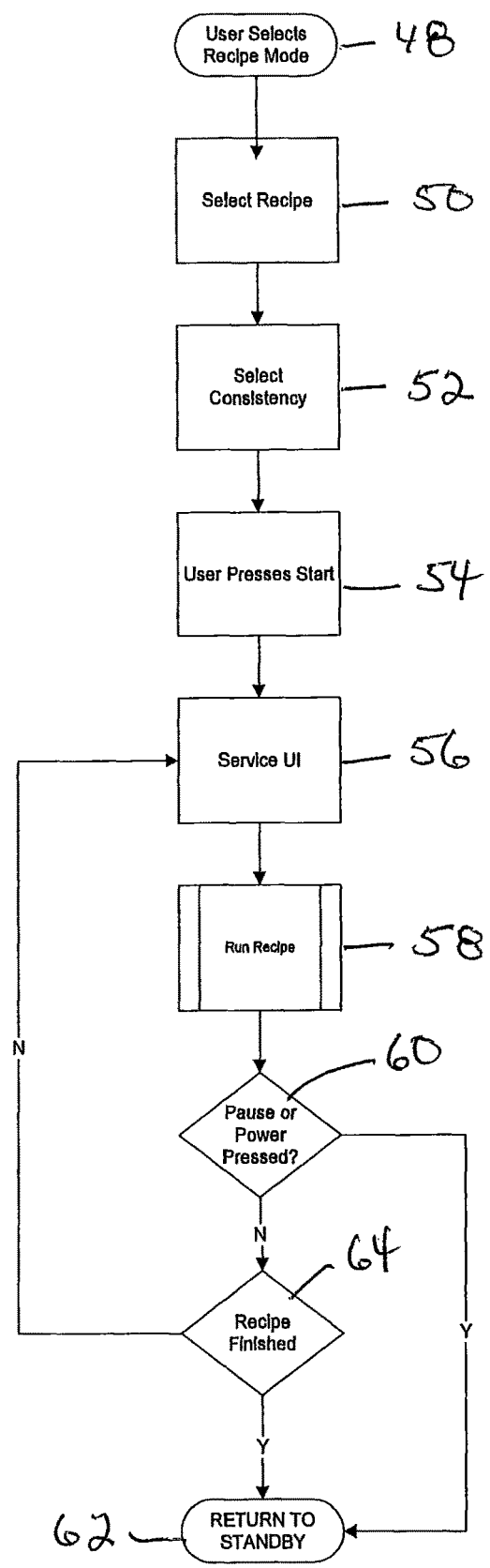
FIG. 4 is simplified overview flowchart of one embodiment of a recipe program operable by the electronics associated with the present blender unit.

FIG. 4 is a flowchart 48 which represents one embodiment of the overall summary operation of the present blender 10 depending upon the particular desired program 34 selected by the user. More particularly, as illustrated in FIG. 4, at step 50, the user will select a particular recipe, for example, by pushing the food mode select button 28 on the user interface 22. Activation of the food select mode button will give the user an opportunity to select one of the recipe programs stored within the present unit. For example, this could be a smoothie recipe, a shake recipe, a frozen drink recipe, a fruits and vegetable recipe, a salsa recipe, or any one of the other programs or recipes identified above. Pushing button 28 will allow all of the recipes stored in memory to appear on the graphic display screen 23. Once the user has selected a particular recipe at step 50, the user will then select a particular end product consistency at step 52 by pushing the desired consistency button 31 associated with the user interface 22. Here again, depending upon the particular recipe selected, some recipes will have a predetermined product output consistency and no selection will be necessary by the user, whereas other recipes such as the smoothie recipe will allow the user to select a particular desired final product consistency such as a thick smoothie or a thin smoothie. Here again, the different consistency levels will appear on the graphic display screen 23. Once the recipe and consistency level has been selected, a user will press the start button 29 at step 54 and at step 56 the present blender 10 will give feedback to the user through the user interface 22 in the form of an animation or graphic display on screen 23 as to the selected recipe and selected consistency level and the microprocessor 32 will start a countdown timer for executing the selected recipe program selected at step 58. As the recipe program selected by the user is running, the microprocessor 32 will continuously check at step 60 as to whether the user has paused the particular program by pressing the start/stop button 29 or by pressing the on/off power switch 27. If the user has paused or powered off the particular program selected, the controller will stop the program and return to a standby mode at step 62. If, on the other hand, the user has not interrupted the selected recipe program at step 60, the microprocessor will move to step 64 and determine if the selected recipe program is finished. If the program is not finished at step 64, the microprocessor 32 will loop back to step 56 and will again proceed through steps 58, 60 and 64. If, at step 64, the selected recipe is finished such as being timed out or other conditions being met as will be hereinafter further explained, the microprocessor will shut down the selected program and move to step 62 and return to a standby mode.

Figure 5:
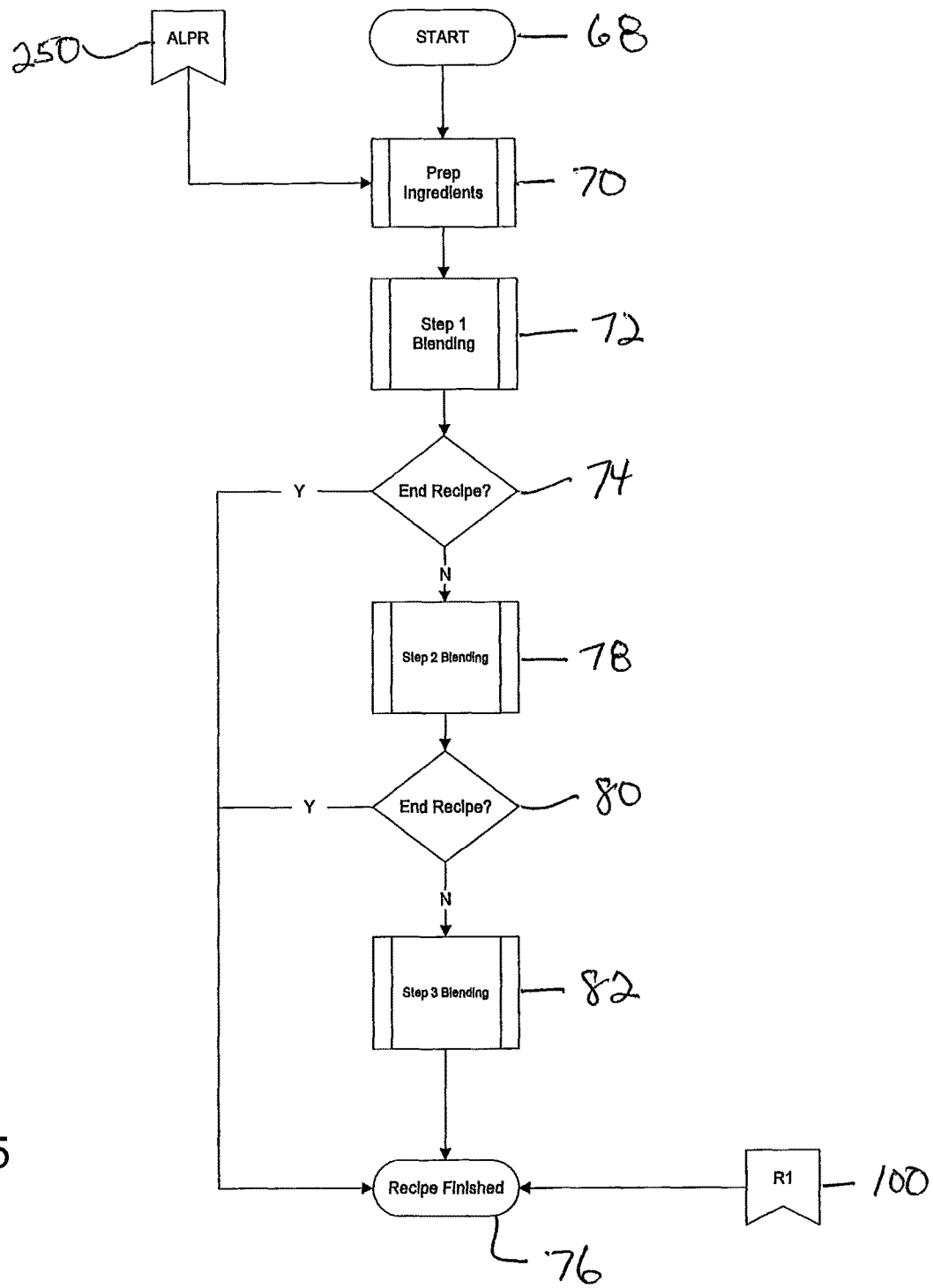
FIG. 5 is a simplified flowchart of one embodiment of a liquid blending procedure operable by the electronics associated with the present blender unit.

FIG. 5 represents one of the possible recipe programs that can be selected by a user such as at step 50 in FIG. 4. FIG. 5 is a flowchart 66 of one embodiment of a liquid blending recipe program that could be selected by the user at step 50 in FIG. 4 and which will run at step 58 in FIG. 4. The liquid blending recipe program 66 can be customized to handle smoothies, fruits and vegetables, and/or frozen drinks, or other recipes. This program describes, but is not limited to, three separate custom blending segments all with variable conditions for current and speed. These three custom segments are referred to in the flowchart of FIG. 5 as a step 1 blending program, a step 2 blending program, and a step 3 blending program. These program segments are specific portions of the overall liquid blending program each with a different goal. These goals can be defined for each blending procedure as follows.

Step 1 blending procedure—chop up large ingredients.
Step 2 blending procedure—reduce in size.
Step 3 blending procedure—optimize consistency.

Figure 6:
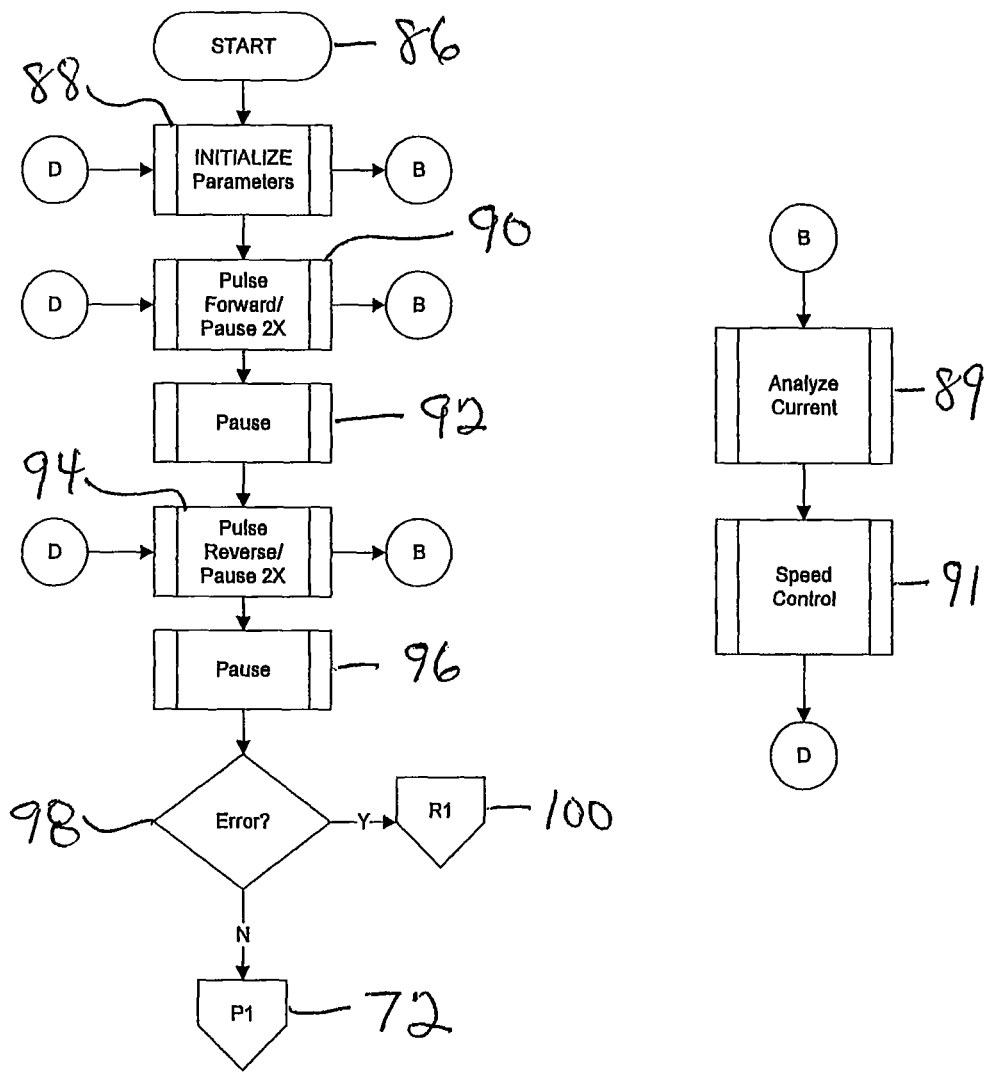
FIG. 6 is a simplified flowchart of one embodiment of a prep ingredients procedure operable by the electronics associated with the present blender unit.

When the liquid blending program is selected at step 68, the user will then place the particular ingredients for the recipe selected into the blender jar 14 at step 70. Once the appropriate ingredients are positioned within the blender jar 14, the microprocessor 32 will initially run the prep ingredients procedure outlined in flowchart 84 of FIG. 6. The prep ingredients program is activated by pressing the start button at step 86 at which time the parameters for the selected recipe are initialized at step 88 and the blender motor is initially pulsed several times in the forward direction at step 90 so as to stir the contents in the jar assembly 14. The blender motor is then paused at step 92 and the motor is then again pulsed several times in the reverse direction at step 94 so as to again stir the contents within the jar assembly 14 in the opposite direction. The blender motor is again paused at step 96 and at step 98 the microprocessor checks for any errors that may be associated with the process such as locked rotor blades, an overcurrent condition, an undercurrent condition, and a wide variety of other checks and balances to make sure that no error has occurred in the prep ingredients procedure program based on predetermined conditions stored in the memory of the microcontroller 32. If an error is detected at step 98, the microcontroller will stop the selected program at step 100 and will return to step 76 of FIG. 5. If, on the other hand, no error is detected at step 98, the microcontroller will proceed to the step 1 blending program (P1) at step 72 of flowchart 66 of FIG. 5. The step 1 blending program at step 72 of FIG. 5 is further detailed in flowchart 102 of FIG. 7 as will be hereinafter further explained. As outlined in steps 89 and 91 of the prep ingredients program 84, the microprocessor 32 continuously monitors and analyzes the current of the blender motor 13 at step 89 and continuously monitors and regulates the speed of the blender motor at step 91. This constant monitoring occurs at steps 88, 90 and 94 as indicated by crossover points B and D in FIG. 6.

Figure 7:
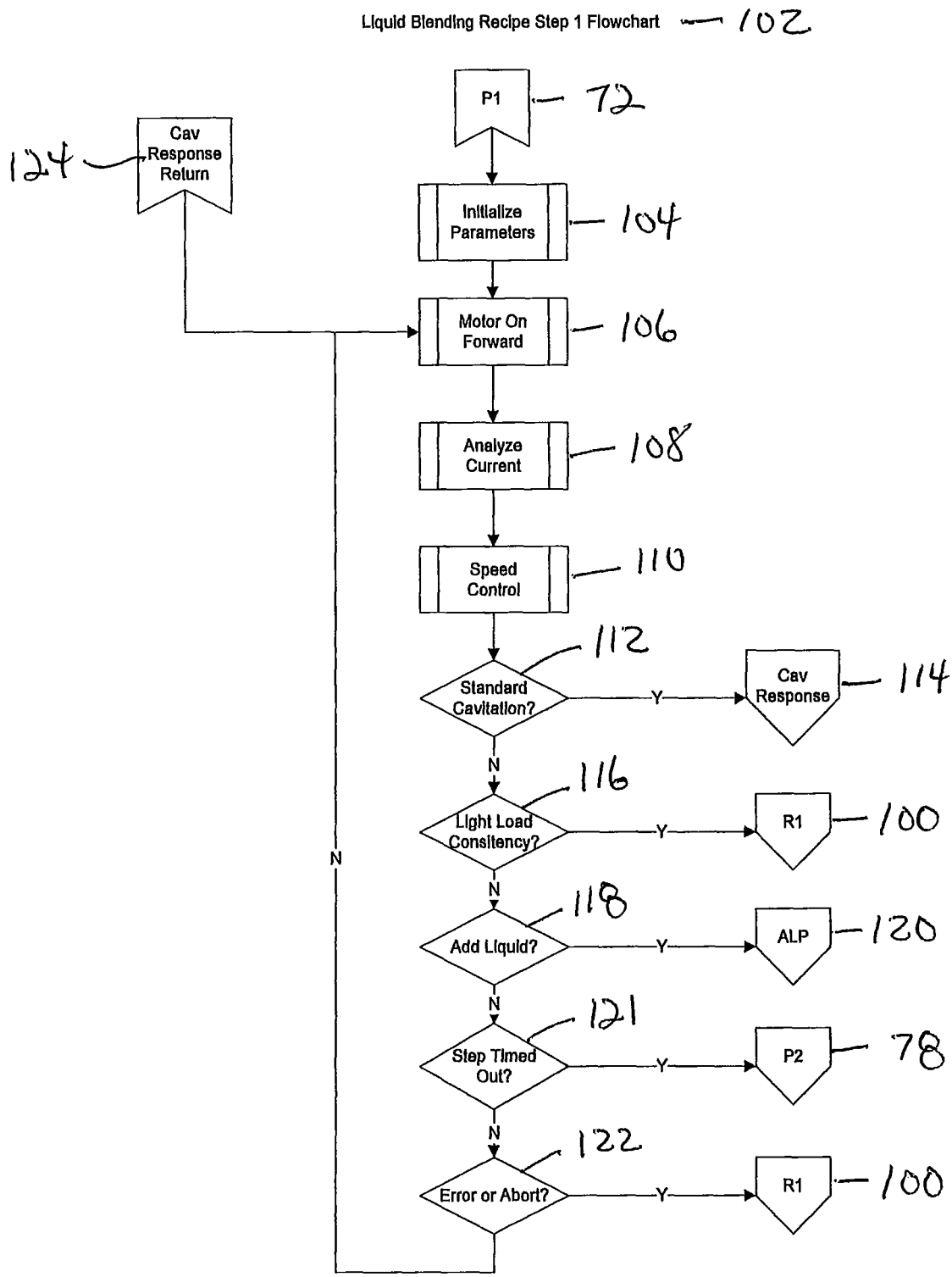
FIG. 7 is a simplified flowchart of one embodiment of the step 1 blending procedure of FIG. 5 operable by the electronics associated with the present blender unit.

Once the step 1 blending program is activated at step 72 of FIG. 5, the microprocessor 32 is initialized with the step 1 blending parameters at step 104 in the flowchart 102 of FIG. 7 and at step 106, the blender motor 13 is turned on in a forward direction so as to chop up large ingredients. Remember, the step 1 blending program is designed to chop up large ingredients. During this program phase, the blender is programmed to pulse and provide continuous blade motion to reduce the large pieces inside the blender jar down to smaller pieces. During this phase, the blender continuously monitors and analyzes the current draw of the blender motor at step 108 and likewise continuously monitors and regulates the speed of the blender motor at step 110. How the current is analyzed will be discussed later with respect to FIG. 14. At step 112, the microprocessor 32 will check for standard cavitation. The standard cavitation check will be discussed in detail with respect to FIG. 10. If standard cavitation as will be hereinafter further explained is detected at step 112, the microprocessor will run the cavitation response program at step 114. The cavitation response program will likewise be discussed in greater detail with respect to FIG. 12. If, however, at step 112, no standard cavitation is detected, the microprocessor 32 will then check for a light load consistency as required by the selected program or as selected by the user at step 116. At this particular step, the present blender 10 is able to detect what kind of load has been placed into the blender container or jar 14. These loads are determined as follows:

light loads—one to two cups of contents;
medium loads—two to four cups of contents; and
heavy loads—four to eight cups of contents.

These cup parameters are general loads and they can change greatly depending on the type of ingredients added to the blender jar according to a specific recipe. This can range from light leafy greens such as spinach to more dense substances that weigh more such as strawberries. The loads are determined by the resistance of the blades and can be measured using a combination of speed and current detection as sensed by the current and speed sensors 36 and 38. These loads will then determine the timing, speed and cavitation detection settings for each of the step 1, step 2 and step 3 blending programs as will be hereinafter further discussed.

If at step 116 of FIG. 7, a light load consistency is determined to exist, then the microprocessor will move to step 100 and will shut down the recipe at step 76 of FIG. 5. If on the other hand, a light load consistency is not detected, that is, the load on the blades is either a medium or heavy load, then the microprocessor will determine if liquid needs to be added to the ingredients at step 118. If the mixture in the blender jar is too thick or has too much dry matter to adequately process the contents within the blender jar, the microprocessor at step 118 will then request that additional liquid be added to the mixture by inputting a signal to the user interface 22 via conductive path 42 (FIG. 3). This will take the form of a message which will appear on the user interface 22 as illustrated in FIG. 1. If this is the case, the microprocessor will implement the add liquid procedure (ALP) at step 120 and then return to step 250 in FIG. 5. The add liquid procedure (ALP) will be hereinafter further explained with respect to FIG. 13. Adding additional liquid to the mixture will help thin out the mixture and allow the system to continue processing the ingredients within the blender jar and it will likewise allow the system to escape from cavitation conditions if they exist. If, on the other hand, no additional liquid needs to be added to the mixture, the microprocessor will move to step 121 and determine if the step 1 blending procedure has timed out. If the procedure has timed out, the processor will move to step 74 in FIG. 5 and determine if the recipe selected by the user has ended. If the recipe has not ended, it will move to step 78 (FIGS. 5 and 7) and will run the step 2 blending procedure (P2) as will be hereinafter further explained. If, on the other hand, the step 1 blending procedure has not timed out at step 121, then the microprocessor will again check for any errors or aborts at step 122 and if no error detection or abort steps have been taken by the user by pressing either the start/stop switch 29 or the power on/off switch 27, then the microprocessor will loop back to step 106 and will continue to run the step 1 flowchart until the step 1 blending procedure has timed out. If, on the other hand, an error or abort signal has been detected by the microprocessor 32 at step 122, then the microprocessor will return to step 100 and will stop the recipe at step 76 of FIG. 5.

It is also recognized that if the cavitation response procedure which will be hereinafter further explained with respect to FIG. 12 was activated at step 114, once the cavitation response procedure has been completed, the microprocessor will return to step 106 at step 124 and the step 1 blending procedure will continue as previously explained.

Figure 8:
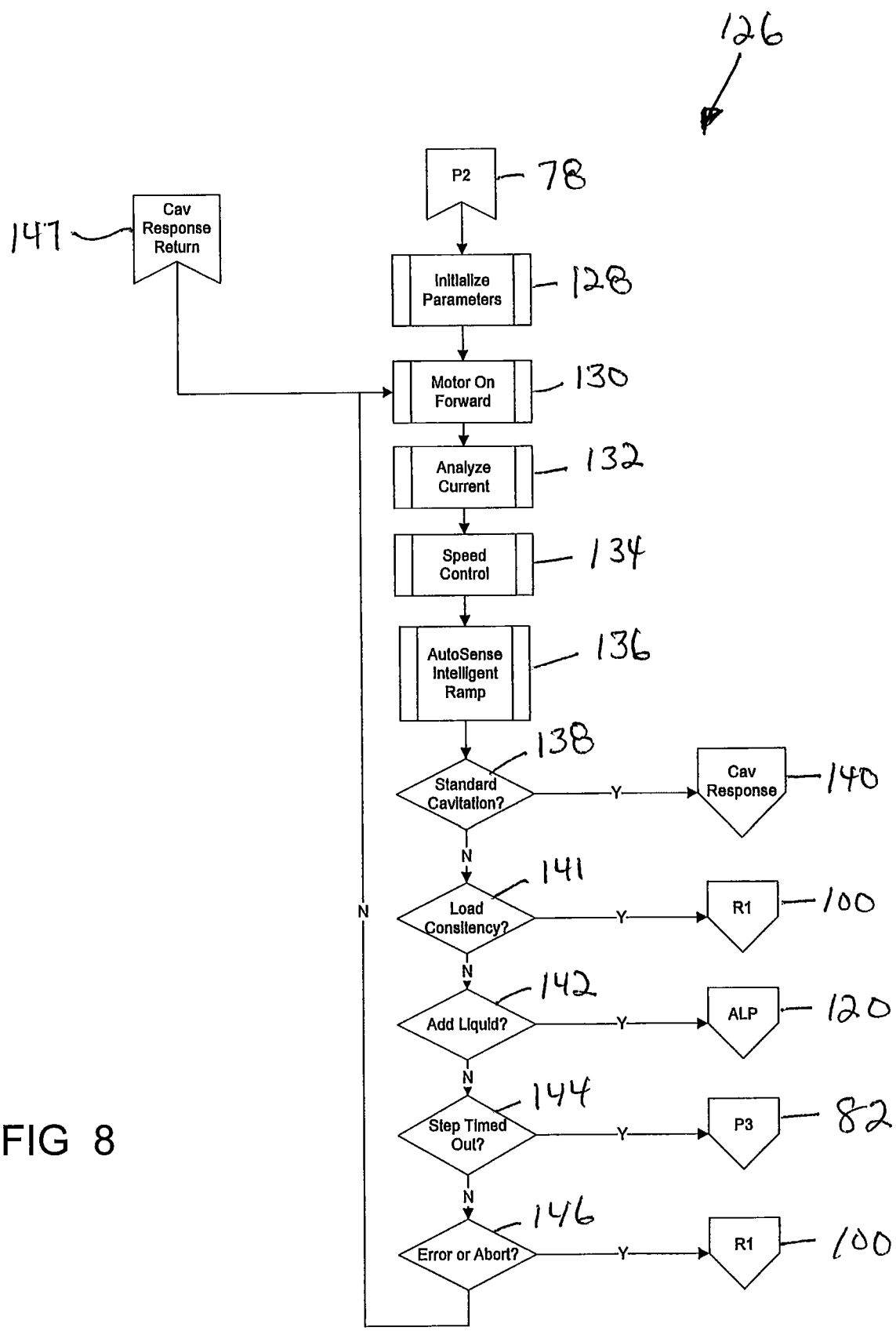
FIG. 8 is a simplified flowchart of one embodiment of the step 2 blending procedure of FIG. 5 operable by the electronics associated with the present blender unit.

Returning to the flowchart of FIG. 5, once the step 1 blending procedure is complete and the recipe has not ended at step 74, the microprocessor will then run the step 2 blending program at step 78. FIG. 8 is a flowchart 126 which describes the step 2 blending program (P2) in detail. More particularly, at step 128, the microprocessor 32 will again initialize the parameters associated with the step 2 blending program. At step 130, the microprocessor will activate the blender motor 13 in a forward direction to further reduce the particle size of the contents and continues to blend the ingredients together. This can be done at either a constant or varying speed depending upon the load detected by the current and speed sensors 36 and 38 and the program selected by the user. The controller 32 will again analyze and monitor the current draw associated with the blender motor at step 132 and the microprocessor will likewise monitor and regulate the speed of the blender motor at step 134 as previously explained. At step 136, the microprocessor will ramp up the current to the blender motor so as to maintain a predetermined load on the blades based upon the ingredients placed within the blender jar 14 and the program selected. This load based ramp up of current to the fastest speed based upon the ingredients placed within the blender jar also helps to prevent cavitation. Again, the step 2 blending procedure is utilized to further reduce the size of the ingredients placed within the blender jar and its parameters are different than the parameters associated with the step 1 blending procedure which was utilized to chop up large ingredients. Once the ramp up occurs at step 136, the microprocessor again checks for standard cavitation at step 138 and if cavitation is detected, the microprocessor will again move to the cavitation response program at step 140. Here again, the cavitation response program will be discussed in greater detail with respect to FIG. 12.

If no cavitation is detected at step 138 of FIG. 8, the microprocessor will now check the load consistency of the contents within the blender at step 141. Depending upon the consistency level selected by the user and/or depending upon the type of ingredients placed within the jar assembly 14, the microcontroller will exit the step 2 blending procedure at step 100 and return to step 76 of FIG. 5 if the desired consistency level of the output product is met at step 141. That is, if the user has selected a thin or thick consistency level and such consistency is met at this phase of the step 2 blending procedure, then the recipe will end. If, on the other hand, the load consistency has not been reached, for example, if the user has selected a thick consistency level of the blending product, then the controller 32 will again determine if liquid needs to be added to the blender contents at step 142. As previously explained with respect to the step 1 blending program, if liquid needs to be added to the blender, the microcontroller will move to step 120 and will activate the add liquid procedure which will be further discussed with respect to FIG. 13. If, on the other hand, no additional liquid needs to be added to the blender contents at step 142, the microcontroller 32 will again check to see if the step 2 blending procedure has timed out at step 144. If the procedure has timed out at step 144, the controller 32 will move to step 80 in FIG. 5 and determine if the recipe selected has ended. If the recipe has not ended, the controller will activate the step 3 blending procedure (P3) at step 82 (FIGS. 5 and 8) which will be hereinafter further discussed. If, on the other hand, the step 2 blending procedure has not timed out at step 144, the controller 32 will again check for an error or abort indication at step 146 and if an error has occurred or if the user has aborted the step 2 blending program, then the controller will again move to step 100 and will shut down the recipe at step 76 in FIG. 5. If on the other hand, no abort or error has been detected at step 146, the controller will loop back to step 130 and continue the step 2 lending program until it has timed out or until one of the other conditions set forth in steps 138, 141, 142 and step 146 have been achieved. Here again, if the cavitation response program has been activated at step 140, once the cavitation response program has been completed, the controller 32 will return to step 130 at step 147 and the step 2 blending program will continue as previously explained.

Returning to FIG. 5, if at the completion of the step 2 blending program at step 78, the controller 32 determines that the recipe selected has not ended at step 80, then microcontroller 32 will proceed to start the step 3 blending program (P3) at step 82.

Figure 9:
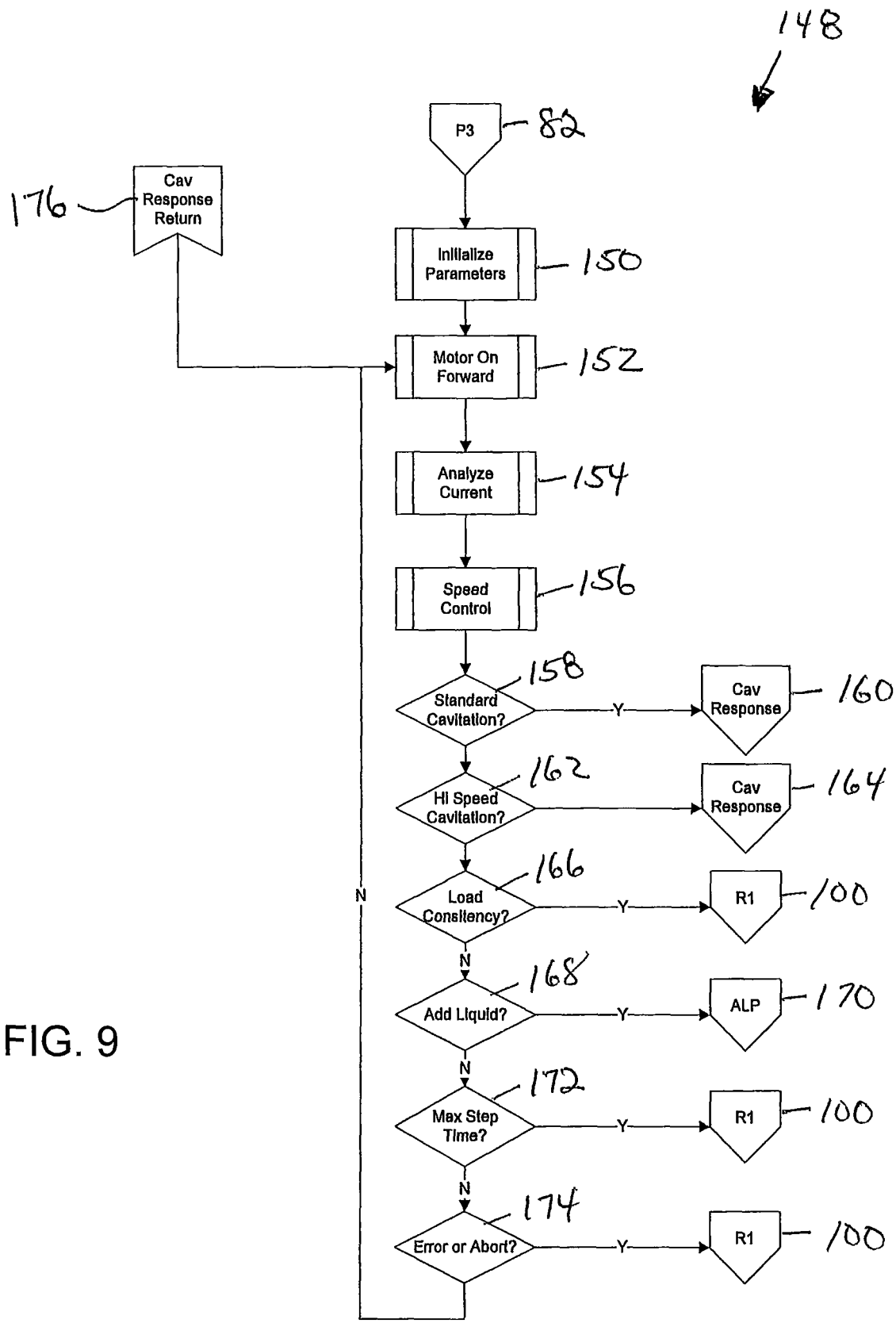
FIG. 9 is a simplified flowchart of one embodiment of the step 3 blending procedure of FIG. 5 operable by the electronics associated with the present lender unit.

FIG. 9 is a flowchart 148 which describes the step 3 blending program (P3) which is utilized to optimize the consistency of the output product. This final stage is used to achieve the desired consistency of the ingredients. During the step 3 blending procedure, the blender motor runs at high speed until a constant current condition is met for a desired load. This predetermined current level and current rise/decline coupled with the speed delta is defined as a thick or thin consistency level depending upon the setting. Separately, a predetermined amount of time at a particular speed can also be used to determine the end point consistency. Once the desired consistency is achieved, the microprocessor will terminate the program as explained in more detail with respect to FIG. 9.

Once the microprocessor moves to the step 3 blending program (P3), the step 3 blending parameters are initialized at step 150 in FIG. 9. At step 152, the microprocessor will again activate the blender motor 13 in a forward direction based upon the initialized parameters. Once again, as explained with respect to FIGS. 7 and 8, the microprocessor will again monitor and analyze the current draw of the blender motor at step 154 and it will monitor and control the speed of the blender motor at step 156. As previously explained, at step 158, the microprocessor will again check for standard cavitation as will be hereinafter further explained and if standard cavitation is detected, the microprocessor will activate the cavitation response program at step 160. If no standard cavitation is detected at step 158, the microprocessor 32 will now check to see if high speed cavitation is detected at step 162. The high speed cavitation test will be further explained in detail with respect to FIG. 11. If high speed cavitation is detected at step 162, the microprocessor will again activate the cavitation response program at step 164. If, on the other hand, no high speed cavitation is detected at step 162, the microprocessor will again check for load consistency at step 166. If the consistency level of the blended product meets the desired consistency level either selected by the user or as predetermined by the selected recipe program, then the microprocessor will terminate the step 3 blending program at step 100 and return to step 76 at FIG. 5. If, on the other hand, the desired or selected consistency level of the blended product has not yet been reached at step 166, the microprocessor will again check to see if liquid needs to be added to the contents of the jar at step 168. If liquid needs to be added to the blender contents at step 168, the microprocessor will move to step 170 and will activate the add liquid procedure which again will be further discussed with respect to FIG. 13. If, on the other hand, no additional liquid needs to be added to the blender contents at step 168, the microprocessor will now check to see if the step 3 blending procedure has reached its maximum time limit at step 172. If the step 3 blending procedure max time limit has been reached at step 172, then the microprocessor will shut down the program at step 100 and move to step 76 of FIG. 5 as previously indicated. If, on the other hand, the max time limit for the step 3 blending program has not been reached at step 172, the microprocessor will again check for an error detection or an abort message from the user at step 174 and if either is detected, the microprocessor will again move to step 100 and will shut down the recipe program at step 76 of FIG. 5. If, on the other hand, no error or abort detection is observed, the microprocessor will loop back to step 152 and will continue to run the step 3 blending procedure as indicated above. If the cavitation response program has been activated at either step 160 or step 164, once the cavitation response program has been completed, the microprocessor will return to step 152 of the step 3 blending program at step 176. Once the step 3 blending program is completed at step 82 of FIG. 5 or step 100 in FIG. 9, the recipe program shuts down at step 76 in FIG. 5.

Figure 10:
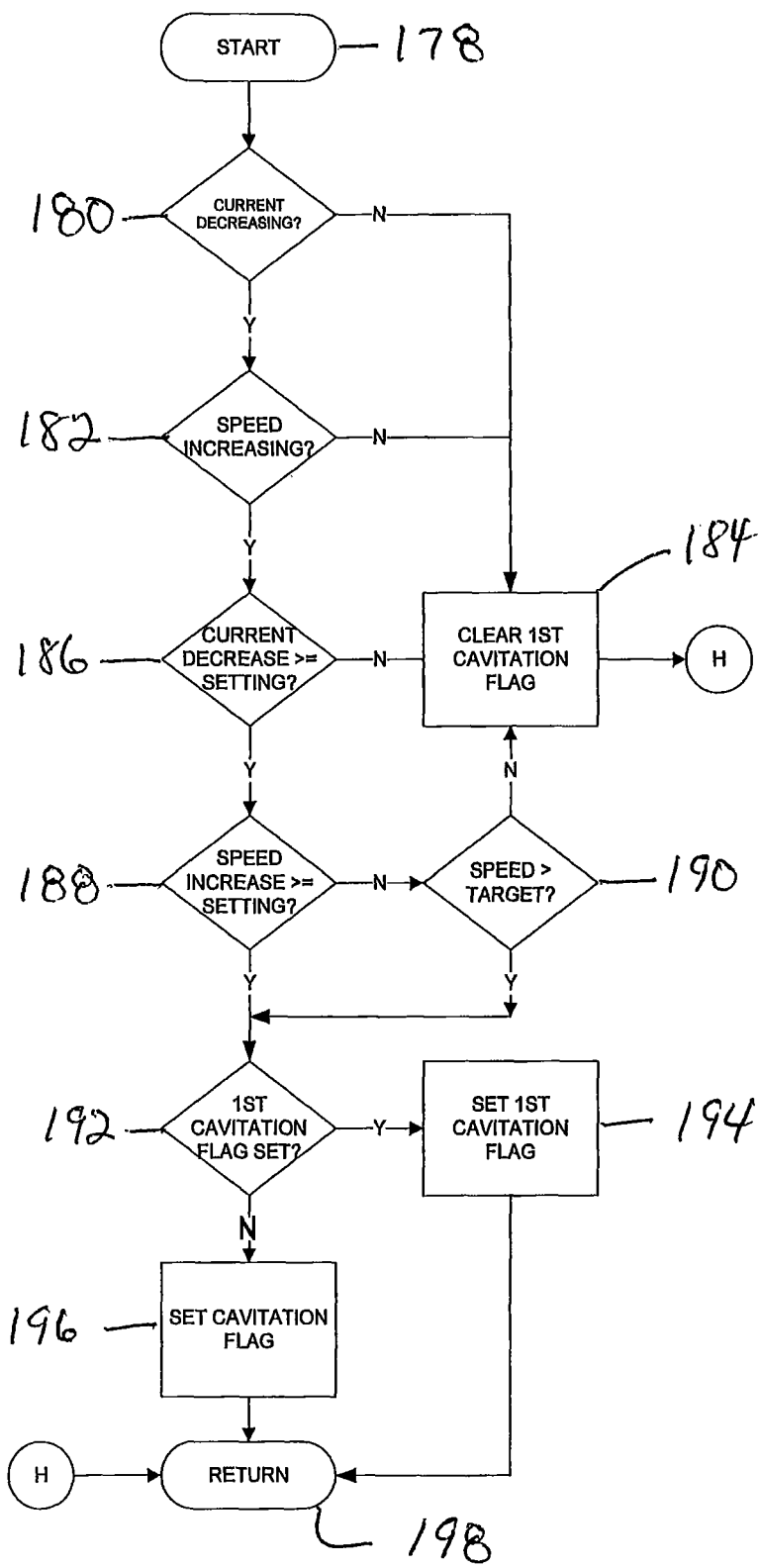
FIG. 10 is a simplified flowchart of one embodiment of a standard cavitation test program operable by the electronics associated with the present blender unit.

Cavitation can be defined as the instance when an air pocket forms around the blender blades forcing the food inside the blender jar upward and away from the blades. This causes the blades to spin freely without agitating any of the contents in the blender jar. FIG. 10 describes the Standard Cavitation Test, FIG. 11 describes the High Speed Cavitation Test, and FIG. 12 describes the primary recovery procedure for cavitation. The conditions from which cavitation is measured inside the blender jar can be defined by a sharp increase in speed and a sharp decrease in current as explained with respect to FIGS. 10 and 11. These two speed/current conditions have different sensitivity for each procedure segment of the program. Once these two conditions for change in current and speed are detected, the controller pauses the current program and goes into a cavitation response procedure which will be explained with respect to FIG. 12. This involves bursts of speed in the forward and reverse direction to eliminate the air bubble formed around the blade, to pull the jar contents back down onto the blade, and to slowly chop any particles that are in the way of the blades.

As illustrated in FIGS. 7, 8 and 9, if standard cavitation is sensed at step 112 in FIG. 7, or at step 138 in FIG. 8, or at step 158 in FIG. 9, the standard cavitation test is initiated and started at step 178 in FIG. 10. Current sensor 36 and speed sensor 38 monitor the current and speed of the blender motor at steps 180 and 182 and each will output signals to the controller indicative of the respective measured readings. The controller will compare these readings to values stored in lookup tables or in the memory of the controller and will determine if standard cavitation exists. If no current decrease is detected at step 180 then no cavitation exists and the program moves to step 184 and clears the cavitation flag. On the other hand, if a sharp decrease in current does occur at step 180, then the microprocessor proceeds to step 182 and checks the speed of the blender motor. If the speed of the blender motor is not increasing at step 182 as compared to stored values for the selected program, then no cavitation is detected and the microprocessor will again move on to step 184 and will return to the current program. On the other hand, if a sharp increase in motor speed is detected at step 182, the microprocessor then checks the current decrease against a predetermined setting at step 186. If the current decrease at step 186 is not greater than or equal to a predetermined value, no cavitation exists and the controller again moves to step 184 and returns to the current program. On the other hand, if the current decrease at step 186 is greater than or equal to the predetermined value, the microprocessor then checks for a speed increase at step 188. If the speed increase at step 188 is not greater than or equal to a predetermined value, then the microprocessor will run a secondary check and will compare the speed of the blender motor to a predetermined target speed at step 190. If the speed of the blender motor is less than the target speed, no cavitation exists and the microprocessor will again move to step 184 and return to the current program. On the other hand, if the speed detected at step 190 is greater than the predetermined target speed, then the microprocessor will move to step 192 and set the cavitation flag at step 194 indicating that a standard cavitation condition exist. If, on the other hand, the speed increase is greater than or equal to the predetermined value at step 188, the controller 32 will move to 192 and set the cavitation flag at step 194. If, for some reason, the cavitation flag is not set at step 192, the cavitation flag will be cleared at step 196 and the test will be complete at step 198.

If cavitation is determined to exist and the cavitation flag is set at step 194, then at step 114 in FIG. 7, step 140 in FIG. 8, and step 160 in FIG. 9, the cavitation response/recovery program will be executed as will be explained with respect to FIG. 12.

Also, importantly, once cavitation is detected and the cavitation response program is started, the current program is paused and the microprocessor will pulse the blender motor with bursts of speed both in the forward and reverse direction in order to eliminate the air bubble formed around the blades and pull the jar contents back down onto the blades as will be further explained with reference to FIG. 12.

Figure 11:
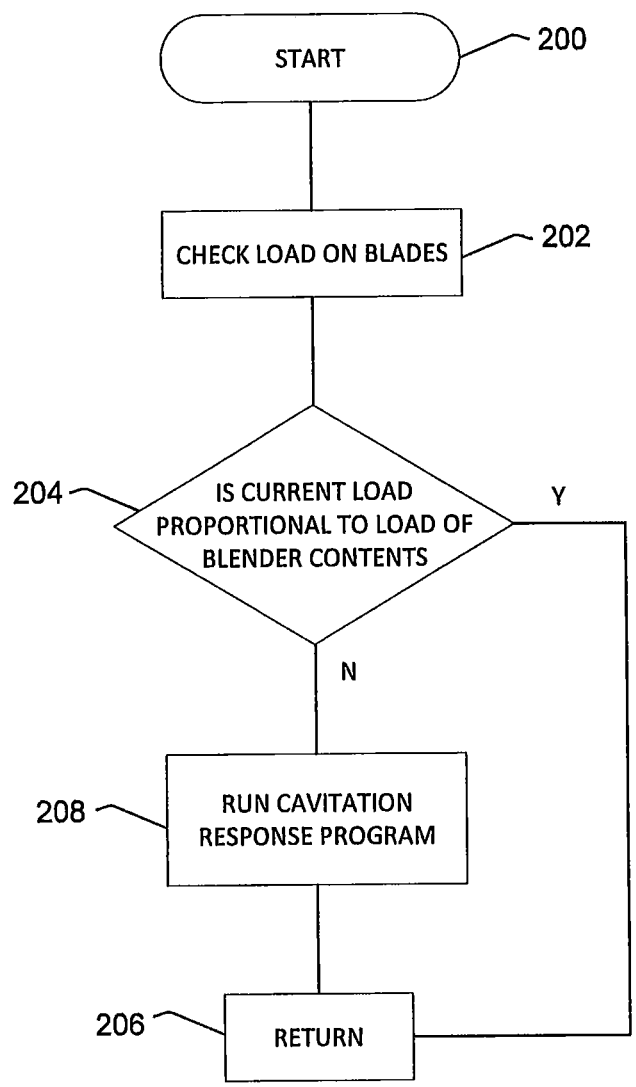
FIG. 11 is a simplified flowchart of one embodiment of a high speed cavitation test program operable by the electronics associated with the present blender unit.

A secondary cavitation condition was discovered in testing of the present blender 10 in addition to the primary or standard cavitation condition. This procedure is illustrated in FIG. 11 and is defined as high speed cavitation. Specific instances were observed under high speed blending conditions where the rate of change of the current and speed of the blender motor 13 did not meet the criteria for primary or standard cavitation detection as outlined in FIG. 10, however cavitation was still observed inside the blender jar. This was primarily found to exist in very thick, highly viscous blends. The detection method for high speed cavitation is to check the load on the blades and ensure that there is sufficient blade resistance. This is primarily accomplished by looking at the current patterns of the motor over a certain number of cycles or over a predetermined period of time and establishing if the current load is proportional to the load of the blender contents inside the blending jar, namely, a light load, a medium load or a heavy load as defined and explained above. These load values are stored in the memory of the controller 32. If secondary or high speed cavitation is detected, the controller will go into the same cavitation response/recovery procedure as outlined in FIG. 12.

FIG. 11 illustrates a simplified version of the high speed cavitation test which, when detected at step 162 of the step 3 blending flowchart 148 (FIG. 9), the high speed cavitation test will be initiated at step 200 and the microprocessor will proceed to check the load on the blades at step 202. At step 204, the microprocessor will look at the current patterns generated in FIG. 14 as will be hereinafter further explained and will compare such patterns to patterns stored in lookup tables or memory and will determine if the current load is proportional to the load of the contents within the blender jar at step 204. If the current load is proportional to the load of the blender contents, then no high speed cavitation exists and the microprocessor will return to step 206 and continue with the current program. If, on the other hand, the current load at step 204 is not proportional to the load of the blender contents, then the cavitation recovery program outlined in FIG. 12 will be activated at step 208. Once the cavitation situation is corrected via the cavitation response/recovery program, the microprocessor will again return to the current program at step 124 in FIG. 7, at step 142 in FIG. 8, and at step 176 in FIG. 9.

Figure 12:
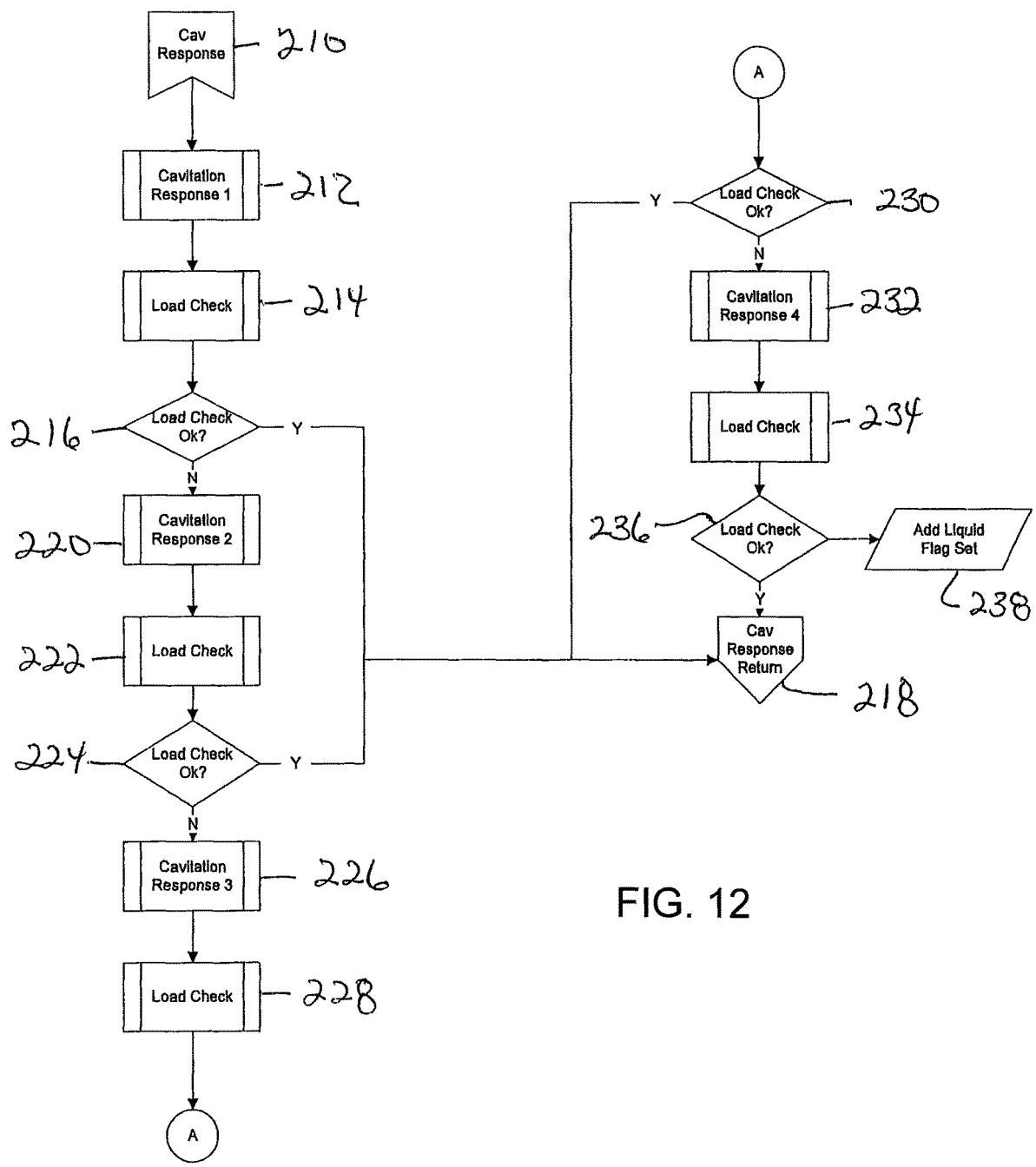
FIG. 12 is a simplified flowchart of one embodiment of the cavitation response/recovery program operable by the electronics associated with the present blender unit.

FIG. 12 illustrates a simplified version of the cavitation response/recovery procedure which, when initiated at step 114 in FIG. 7, at step 140 in FIG. 8, or at steps 160 and 164 in FIG. 9, this program will start at step 210 in FIG. 12. Once initiated, cavitation response 1 will be implemented at step 212. Cavitation response 1 includes pulsing the blending motor 13 with bursts of speed both in the forward and reverse direction in order to eliminate the air bubble formed around the blades and pull the jar contents back down onto the blades. This pulsing occurs over a predetermined set period of time and at a predetermined motor speed. This can be done at a constant predetermined speed or at predetermined varying speeds. Once the pulsing of the blender motor is completed at step 212, a load check is performed at step 214 to ensure that the blades are loaded with blending contents and no longer are in cavitation. At step 216, the microprocessor will compare the current level measured by a current sensor 36 to see if the current level is above a predetermined current level at a particular speed stored in a lookup table or memory. If the current level at step 216 is above a predetermined current level at a particular speed stored in memory or in a lookup table, then the microcontroller 32 will terminate the cavitation response program and exit the program at step 218. If, on the other hand, the current level of the blender motor at step 216 is not above the predetermined current level at a particular speed, then the microprocessor will move to step 220 and will activate the cavitation response 2 program. The cavitation response 2 program is similar to the cavitation response 1 program except that the pulsing of the blender motor both in the forward direction and in the reverse direction in order to eliminate the cavitation situation is more aggressive, that is, at higher motor speeds, and the pulsing is for a longer period of time. Once the cavitation response 2 program is complete, the microprocessor will again check the load on the blender blades at step 222 and will again compare the current level of the blender to a predetermined current level at a particular speed at step 224. Here again, if the current level of the blender is again above a predetermined current level at a particular speed, then the microcontroller will terminate the cavitation response program at step 218 and will return to the current program. Here again, if at step 224, the current level of the blender motor is not above a predetermined current level at a particular speed, then the microcontroller will move to step 226 and activate the cavitation response 3 program.

The cavitation response 3 program is again more aggressive and for a longer duration as compared to the cavitation response 2 program in order to eliminate the cavitation situation. At step 228, the controller will again perform a load check and, at step 230, the controller 32 will again compare the current level measured by the current sensor 36 to see if the current level of the blender motor is above or below a predetermined current level at a particular speed stored in a lookup table or in memory of the microprocessor. Here again, if the current level of the blender motor is above the predetermined current level at a particular speed at step 230, then the microcontroller will again terminate the cavitation response program at step 218 and will return to the current recipe. On the other hand, if the current level of the blender motor is not above the predetermined current level at a particular speed at step 230, then the microcontroller will move to step 232 and will activate the cavitation response 4 program. Here again, the cavitation response 4 program is more aggressive and for a longer duration as compared to the cavitation response 3 program. At steps 234 and 236, the controller will again conduct a load check and if the current level of the blender motor as measured by the current sensor 36 is above the predetermined current level, then the microcontroller will again terminate the cavitation response program at step 218 and will return to the current recipe. If, on the other hand, after activation of the cavitation response 4 program at step 232, if the current level of the blender motor is not above the predetermined current level at a particular speed at step 236, the microcontroller will then set the add liquid flag at step 238 because the blender is unable to adequately blend the contents within the blending jar 14 and is unable to escape the cavitation situation. This is true when the mixture inserted into the blending jar is too thick and has too much dry matter to adequately process the contents. Under this condition, the blender program selected will continue to run but if cavitation persists over multiple iterations of the cavitation response procedure, namely, cavitation response 1, 2, 3 and 4, the microprocessor will then request additional liquid to be added to the mixture at step 238 by inputting a signal to the user interface 222 via conductive path 42. This again will take the form of a message which will appear on the user interface 22. Adding additional liquid to the mixture will help thin out the mixture and will allow the system to escape from cavitation conditions before resuming the selected recipe.

Figure 13:
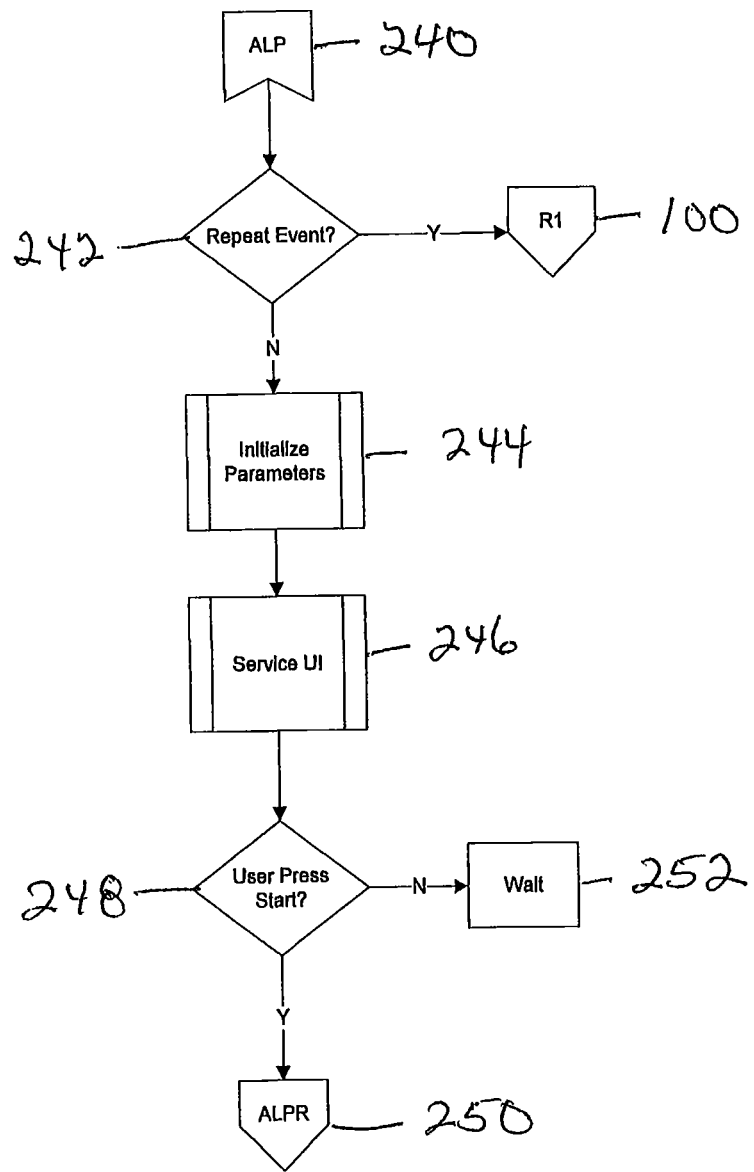
FIG. 13 is a simplified flowchart of one embodiment of the add liquid procedure operable by the electronics associated with the present blender unit.

FIG. 13 illustrates the add liquid procedure which can be activated at step 120 in FIG. 7, at step 120 in FIG. 8, at step 170 in FIG. 9, and at step 238 in FIG. 12. When the add liquid procedure is activated at step 240, the controller 32 will check to see if additional liquid has been added to the blender contents at step 242. If this event has been repeated at one of the previous steps as indicated above, then the microcontroller will return to step 100 in FIG. 5, or if cavitation continues to exist, the controller will request that additional liquid be added to the mixture so that it can escape from the cavitation condition at step 238. If additional liquid needs to be added to the blender contents, then the microcontroller will again initialize the parameters associated with this program at step 244 and will give feedback to the user via the user interface 22 in the form of a message requesting the user to add additional liquid to the contents at step 246. The microprocessor will then wait until the user presses the start button 29 at step 248. When the user presses the start button at step 248, the microcontroller will return to the current recipe at step 250 (FIGS. 5 and 13). If, on the other hand, the user does not press the start button 29 at step 248, the controller will then continue to wait until the start button is activated at step 252.

Figure 14:
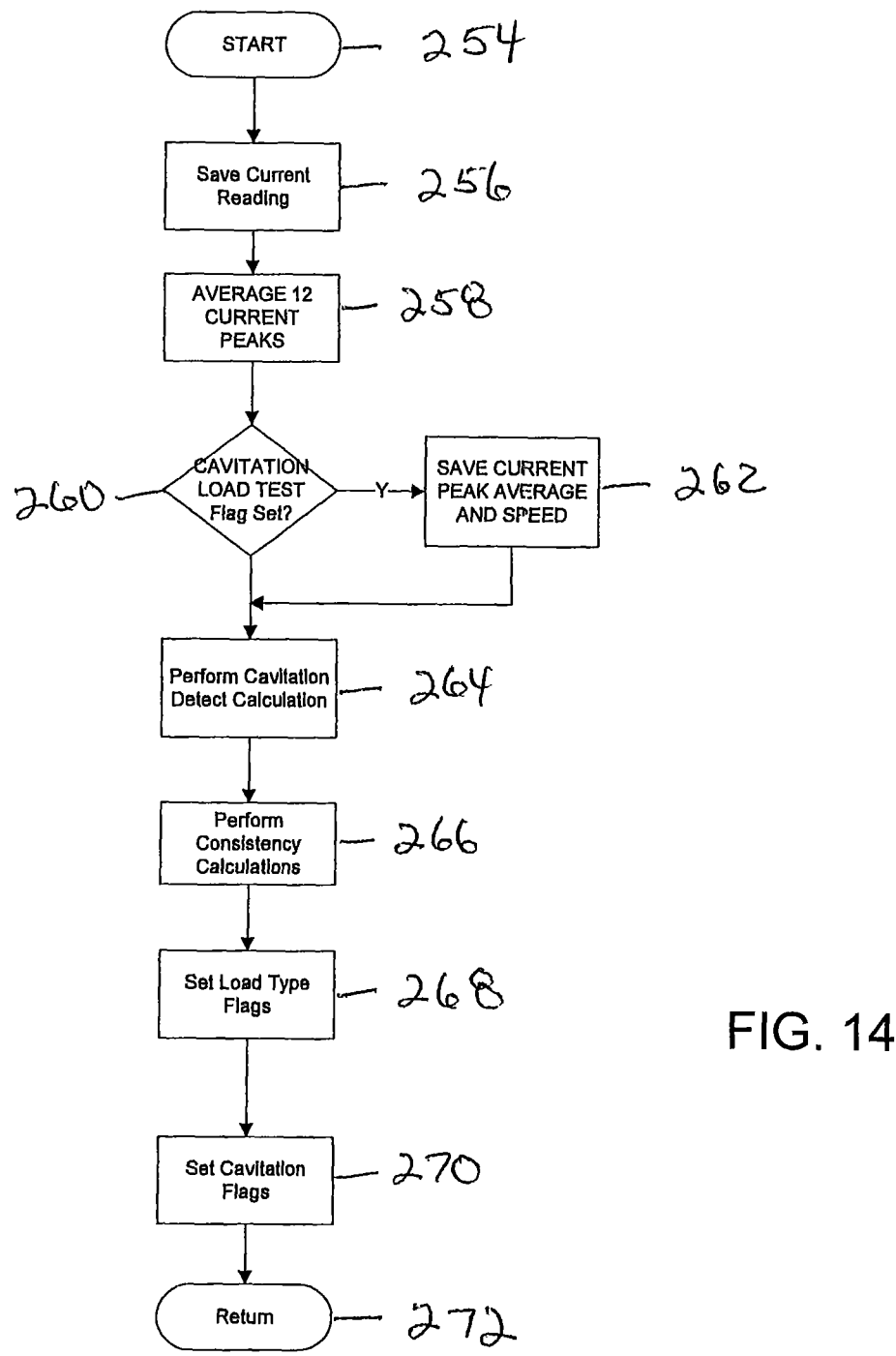
FIG. 14 is a simplified flowchart of one embodiment of a program which analyzes the current output of the blender motor operable by the electronics associated with the present blender unit.

FIG. 14 illustrates a simplified version of the analyze current program which is activated within various programs as illustrated above. Whenever the microprocessor is called upon to analyze the current drawn from the blender motor, the analyze current routine set forth in FIG. 14 is activated at step 254. The analyze current routine is called upon to perform multiple calculations and to set numerous flags to indicate the state of the blending and load measured by the current sensor 36. The microprocessor 32 calls upon an analog to digital converter to provide a representation of the current being drawn by the blender motor. This most recent reading is then saved at step 256. The microprocessor then performs an averaging function using the most recent data and previously stored data over the last 12 current peaks at step 258. The controller also checks to see if the blender is currently in a cavitation load test situation at step 260 and if this is true, the controller performs additional speed and current measurements and saves this data at step 262. The microprocessor will then also perform calculations to determine if the latest measured current at step 262 meets the cavitation parameters set forth in FIGS. 10 and 11 at step 264 and, if so, sets appropriate flags at step 270. At step 266, the microcontroller also performs further calculations to determine if there is enough consistency in the readings to set and determine a load type, that is, a light load, a medium load or a heavy load as defined above, and if so, the controller sets the appropriate flags at step 268 for the load type. The microcontroller then returns all of the data to be used by the calling function associated with the particular recipe or program being run at that specific time at step 272. This data is utilized throughout the liquid blending recipe and the step 1, step 2 and step 3 blending programs illustrated in FIGS. 5 and 7-9; it is utilized in the prep ingredients procedure illustrated in FIG. 6, and it runs behind the scenes in many of the other programs discussed above.

In addition, a critical part of the present blender is the agitator blades 19. The present blades are sharper on both the front edge and the rear edge. The blades can be straight-edged or beveled blades. The front edge of the blades are typically used for cutting up pieces in the blender needed to slice through large chunks of contents in the blender jar. In a reverse direction, the rear edge of the blades have a different sharpness and can be just as sharp as the blades in the forward direction, but the rear edge can also range in sharpness so as to be completely blunt. This is used to shear the contents apart in a reverse direction, instead of cutting through the contents. As such, the agitator blades 19 of the present blender unit 10 may include one degree of sharpness on the forward edge of the blade and a different degree of sharpness on the back or rear edge of the blade. In addition, the sharpness associated with both the front and rear edges of the blade may also be the same.

It is also recognized and anticipated that the PCBA control logic and the sensors 36 and 38 can be used in other food processing devices where blending of contents placed within a mixing container occurs. Also, it is recognized and anticipated that any number of step blending procedures may occur in any particular program, such as the program illustrated in FIG. 5. In addition, any type of user interface 22 can be used with the present blender 10, including a rotary selection dial, push on/off buttons, a graphic display screen, touch screen activation, and other user interface elements. It is also recognized that many of the disclosed programs as illustrated in FIGS. 4-14 may run concurrently and simultaneously with each other to check for cavitation, blade resistance and product consistency.

It is also recognized and anticipated that although only the liquid blending recipe flowchart has programs as disclosed in detail herein, the cavitation test programs of FIGS. 10 and 11, the cavitation response program of FIG. 12, the add liquid program of FIG. 13 and the analyze current program of FIG. 14 can likewise be incorporated into respective programs for shakes, salsas, juices, chopping, dicing and any other programs stored in memory in a manner similar to the incorporation of those programs into the liquid blending program.

It is further recognized that variations in the steps depicted in flowcharts 4-14 could be made without departing from the spirit and scope of the present invention. In particular, steps could be added or some steps could be eliminated. All such variations are intended to be covered by the present invention. It is also recognized that other sensors could likewise be utilized.

Thus, there has been shown and described a novel intelligent blender unit. As is evident from the foregoing description, certain aspects of the present inventions are not limited by the particular details of the examples illustrated herein, and it is therefore contemplated that other modifications, applications, variations, or equivalence thereof, will occur to those skilled in the art. Any such changes, modifications, variations and other uses and applications of the present constructions will, however, become apparent to those skilled in the art after considering this specification and the accompanying drawings. All such changes, modifications, variations and other uses and applications which do not depart from the spirit and scope of the present invention or deemed to be covered by the present invention which is limited only by the claims filed.

What is claimed is:

1. A blender comprising:
   a base assembly;
   a motor positioned within the base assembly;
   a blender jar selectively engageable with the base assembly, the blender jar including an agitator blade assembly, the agitator blade assembly including at least one agitator blade and an agitator shaft for connection to the motor in the base assembly;
   electronics housed within the base assembly and electronically connected to a power source, the electronics including at least one controller, memory for storing at least one operating program for controlling the operation of the motor, at least one current sensor coupled to the controller for measuring the current being utilized by the motor at any particular time, said at least one current sensor outputting a signal to the controller indicative of the current being utilized by the motor, and at least one speed sensor coupled to the controller for measuring the speed of the motor at any particular time, said at least one speed sensor outputting a signal to the controller indicative of the speed of the motor;
   wherein signals from the current and speed sensors to the controller during operation of said at least one operating program controls the operation of the motor during execution of said at least one operating program,
   wherein the controller is configured to analyze signals from the current and speed sensors and to compare changes in the measurements of the current and speed over a predetermined period of time, to predetermined values for changes to the measurements of the current and speed over the predetermined period of time stored in memory to determine if a cavitation situation exists within the blender jar;
   wherein the controller is configured to determine the resistance placed on the at least one agitator blade based on signals from the current and speed sensor, and to compare the determined resistance with predetermined resistance values corresponding to light, medium or heavy loads to classify the load within the blender jar accordingly.

2. The blender defined in claim 1 wherein the controller is further configured to execute a cavitation recovery program if it determines that a cavitation situation exists within the blender jar.

3. The blender defined in claim 1 wherein the controller is configured to check the load on the at least one agitator blade to determine if a high speed cavitation situation exists within the blender jar and, if so, the controller is further configured to execute a cavitation recovery program.

4. The blender defined in claim 1 including a user interface associated with the base assembly, the user interface allowing a user to select variable consistencies associated with the output of the product placed within the blender jar.

5. The blender defined in claim 4 wherein the variable consistencies associated with the output of the product placed within the blender jar includes at least a thick consistency and at least a thin consistency.

6. The blender defined in claim 4 wherein the controller is further configured to determine the consistency associated with the output of the product placed within the blender jar by comparing the measured current of the motor to a predetermined current level stored in memory.

7. The blender defined in claim 4 wherein the controller is further configured to determine the consistency associated with the output of the product placed within the blender jar by comparing the measured current of the motor to a rate of change of the current over a predetermined period of time.

8. The blender defined in claim 4 wherein the controller is further configured to determine the consistency associated with the output of the product placed within the blender jar by comparing the measured speed of the motor to a predetermined speed stored in memory.

9. The blender defined in claim 4 wherein the controller is further configured to determine the consistency associated with the output of the product placed within the blender jar by comparing the measured speed of the motor to a rate of change of the speed of the motor over a predetermined period of time.

10. The blender defined in claim 4 wherein the controller is further configured to achieve the consistency associated with the output of the product placed within the blender jar as selected by a user by outputting a signal to the motor to operate at predetermined speed for a predetermined period of time.

11. The blender defined in claim 1 wherein the at least one agitator blade includes a front edge and a rear edge, and wherein the front edge of the at least one agitator blade has one degree of sharpness and the rear edge of the at least one agitator blade has a different degree of sharpness.

12. The blender defined in claim 1 wherein the at least one operating program stored in memory for controlling the operation of the motor includes a recipe program, a liquid blending program, a standard cavitation test program, a high-speed cavitation test program, an analyzed current program, and a cavitation response program, said controller being configured to execute any one or more of said programs for controlling the operation of the motor in accordance with the selected program.

13. The blender defined in claim 12 wherein, when the controller executes the standard cavitation test, the controller is configured to compare a current decrease to a predetermined value and compares a measured speed increase to a predetermined value in order to determine if a cavitation situation exists within the blender jar.

14. The blender defined in claim 13 wherein if the controller determines that a cavitation situation exists within the blender jar, the controller is configured to output a signal to pulse the motor with bursts of speed in both the forward and reverse direction to alleviate the cavitation situation and will then check the measured current of the motor to determine if the measured current is above a predetermined current level at a particular speed.

15. The blender defined in claim 12 wherein, when the controller executes the high speed cavitation test program, the controller is configured to check the load on the at least one agitator blade by checking to see if the measured current load is proportional to the load generated by the product placed within the blender jar.

16. The blender defined in claim 12 wherein, when the controller executes the liquid blending program, the controller is configured to check for cavitation during operation of said program.

17. The blender defined in claim 12 wherein the liquid blending program includes a load based ramp up of current to the blender motor wherein, when the controller executes the liquid blending program, the controller is further configured to ramp up the current to the blender motor to maintain a predetermined load on the at least one agitator blade based on the ingredients placed within the blender jar.

18. A food processor comprising:
a base assembly having a motor positioned therewithin;
a blender jar selectively engageable with the base assembly, the blender jar including a plurality of agitator blades and an agitator shaft for connection to the motor positioned within the base assembly;
a lid member for selectively closing access to the blender jar;
at least one controller and memory for storing at least one operating program for controlling the operation of the motor in a forward and reverse direction;
at least one current sensor coupled to the controller for measuring the current being utilized by the motor at any particular time, said at least one current sensor outputting a signal to the controller indicative of the current being utilized by the motor;
at least one speed sensor coupled to the controller for measuring the speed of the motor at any particular time, the at least one speed sensor outputting a signal to the controller indicative of the speed of the motor;
said at least one controller comparing measured current and speed values and measured changes in the current and speed values over a predetermined period of time from said at least one current sensor and said at least one speed sensor to predetermined stored values in memory for current and speed values and predetermined stored values in memory for changes in the current and speed values over the predetermined period of time during the operation of said at least one operating program in order to determine if a cavitation situation exists within the blender jar, the at least one controller outputting a signal to control the operation of the motor in response to the signals received from said at least one current sensor and said at least one speed sensor;
wherein the controller is configured to determine the resistance placed on the at least one agitator blade based on signals from the current and speed sensors, and to compare the determined resistance with predetermined resistance values corresponding to light, medium or heavy loads to classify the load within the blender jar accordingly.

19. The blender defined in claim 1 wherein the light load corresponds to having less than two cups of contents within the blender jar, the medium load corresponds to having about two to about four cups of contents within the blender jar, and the heavy load corresponds to having more than four cups of contents within the blender jar.

* * * * *